March 6, 1951      H. C. RIEMANN      2,544,045
ADJUSTABLE WINDSHIELD VISOR
Filed June 28, 1948      4 Sheets-Sheet 1
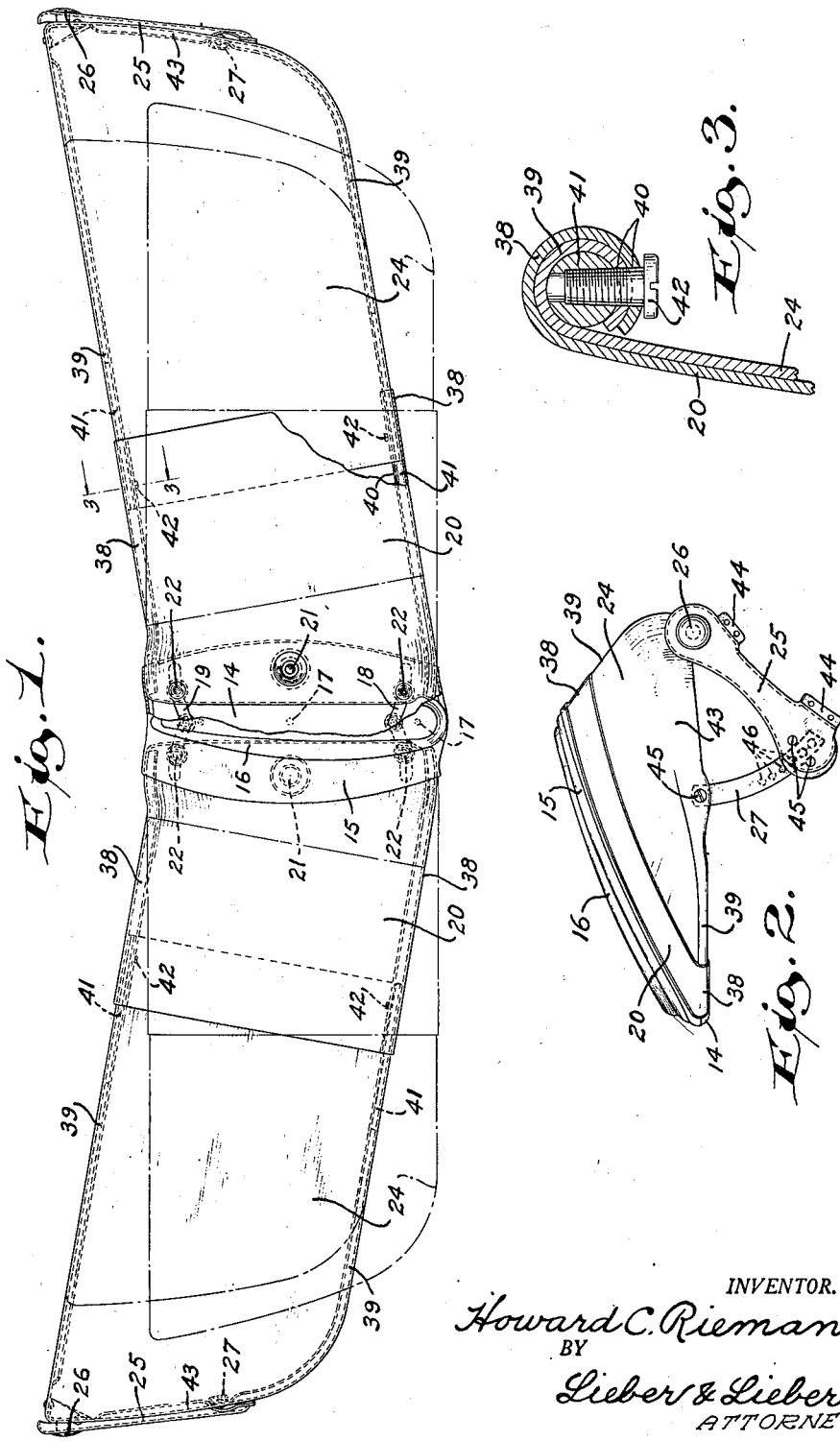
INVENTOR.
Howard C. Riemann
BY
Lieber & Lieber
ATTORNEYS.

March 6, 1951 H. C. RIEMANN 2,544,045
ADJUSTABLE WINDSHIELD VISOR
Filed June 28, 1948 4 Sheets-Sheet 2
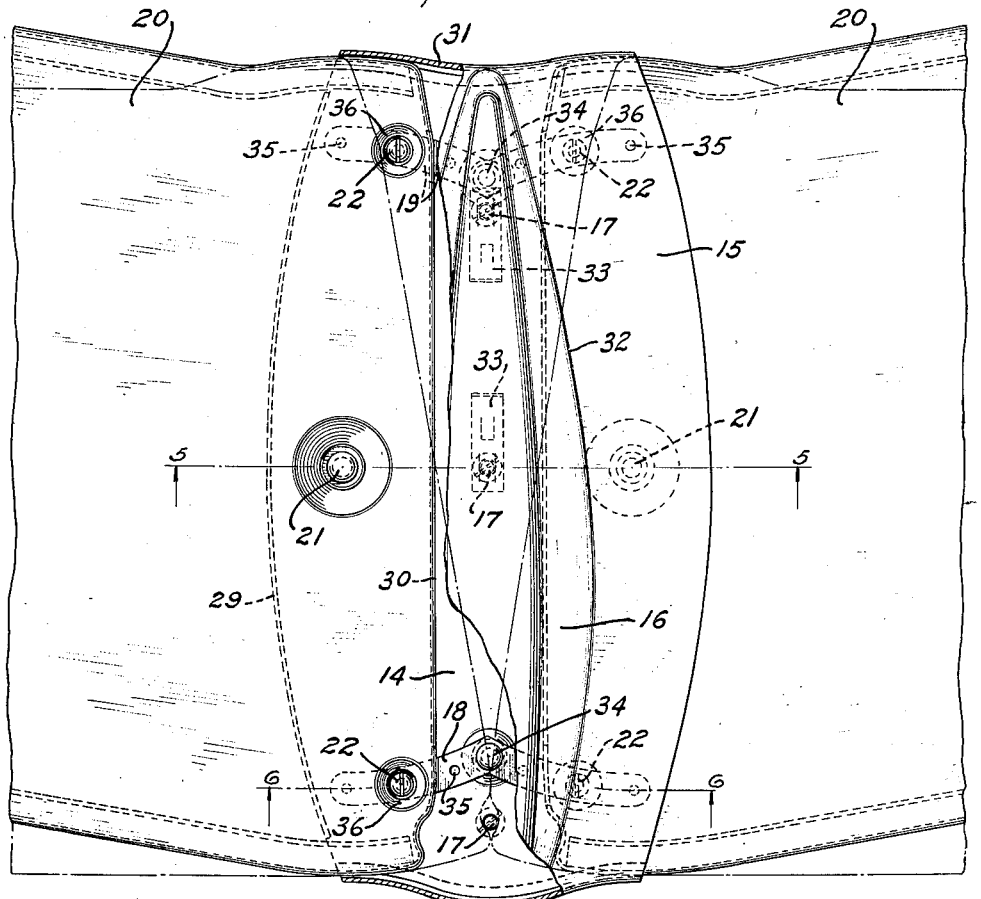
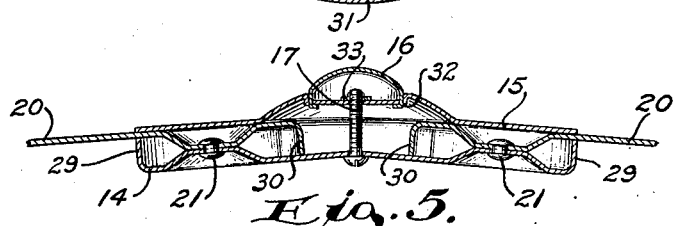
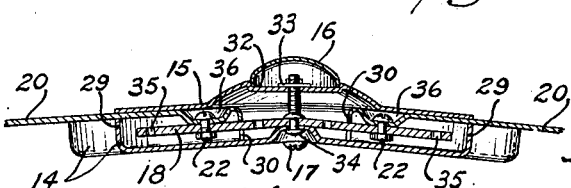
INVENTOR.
Howard C. Riemann
BY
Lieber & Lieber
ATTORNEYS.

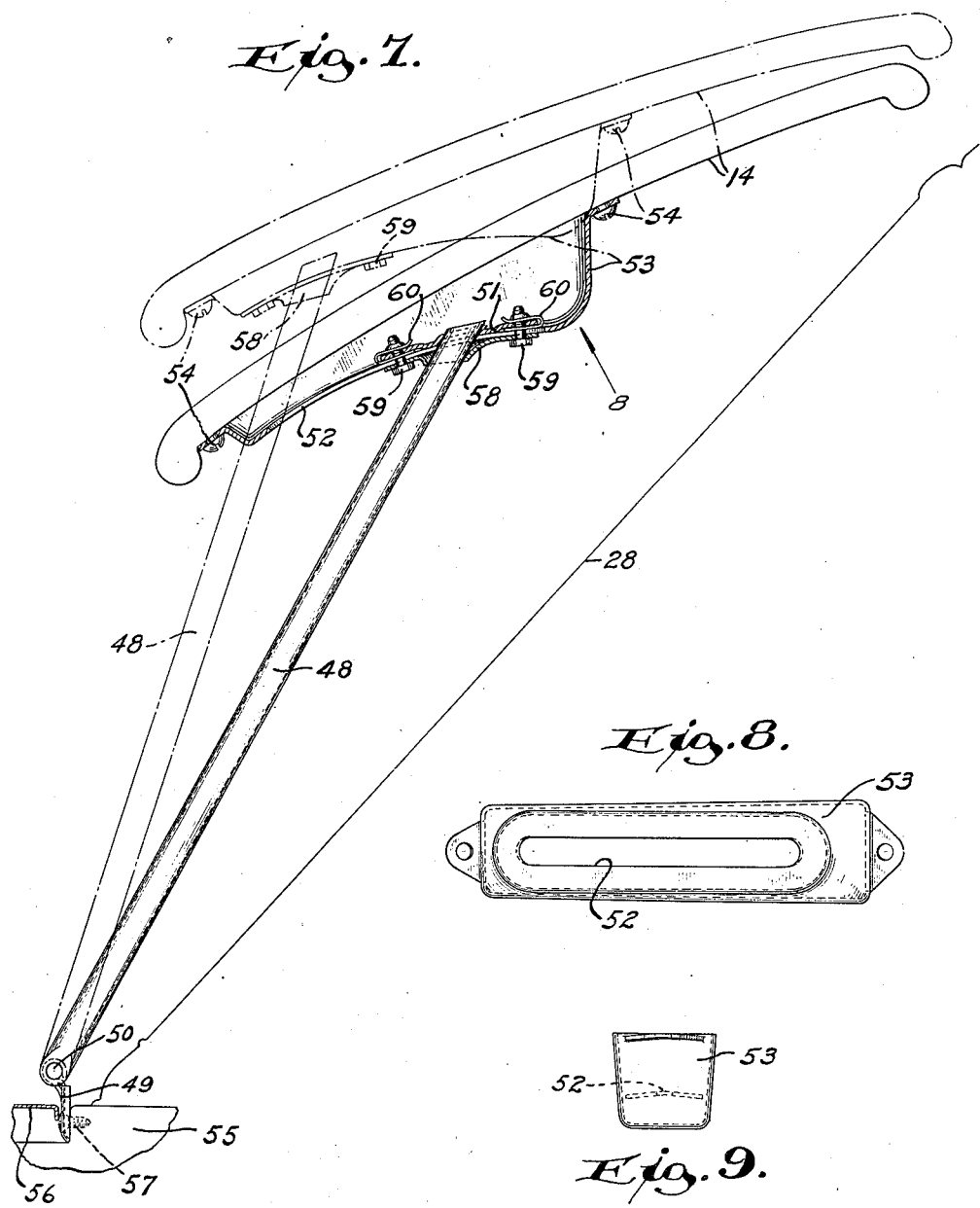

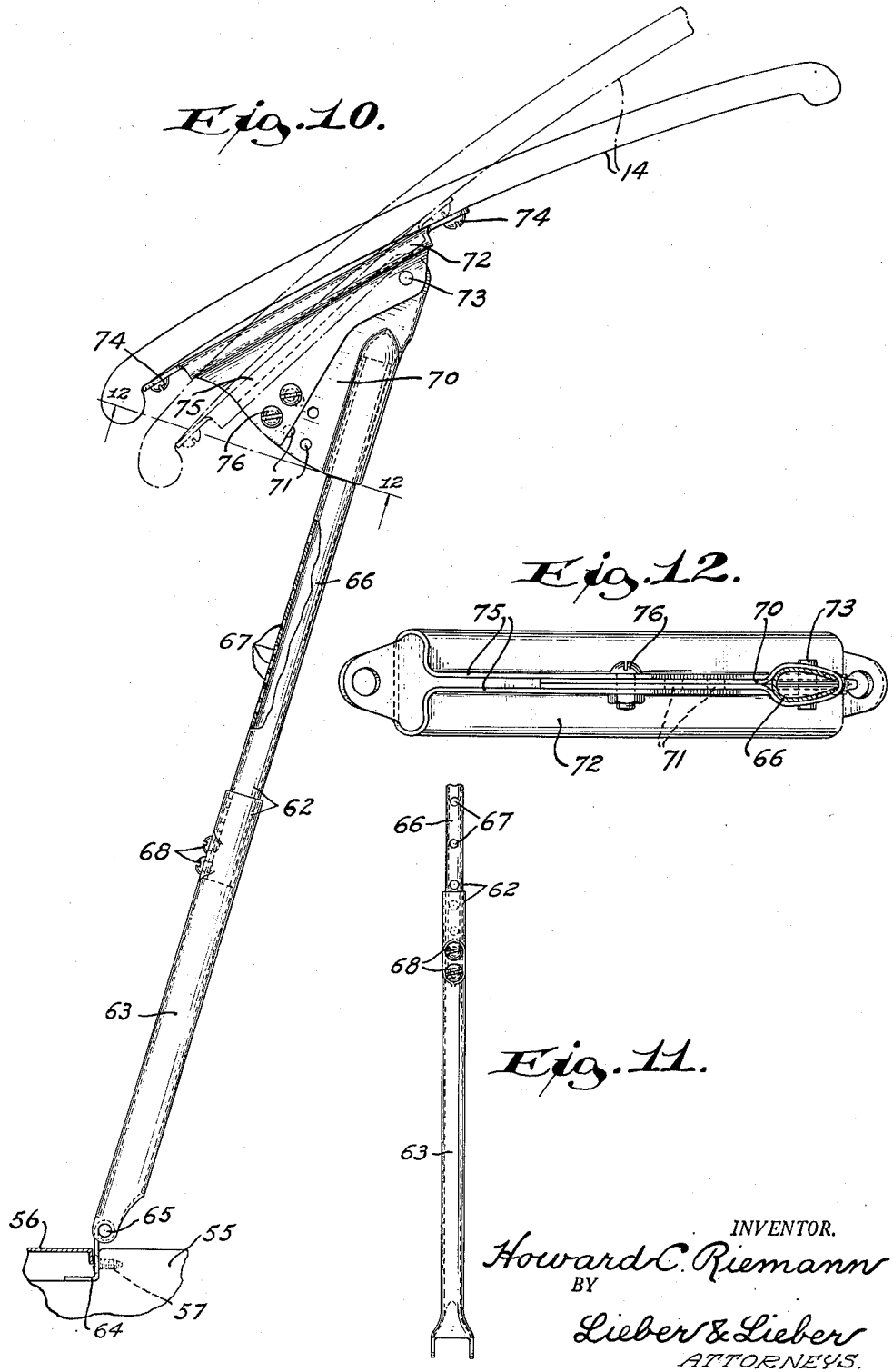

Patented Mar. 6, 1951

2,544,045

UNITED STATES PATENT OFFICE 2,544,045

ADJUSTABLE WINDSHIELD VISOR

Howard C. Riemann, West Allis, Wis., assignor to The Fulton Company, West Allis, Wis., a corporation of Wisconsin Application June 28, 1948, Serial No. 35,539

4 Claims. (Cl. 160—119)

My present invention relates in general to improvements in devices for augmenting the comfort and safety of the operators and occupants of motor vehicles, and relates more especially to various improvements in the construction and operation of adjustable windshield visors for automobiles or the like.

The primary object of this invention is to provide an improved windshield visor assemblage which is simple and durable in construction, and which is also highly efficient in operation and flexible in its adaptations.

Many different kinds of windshield visors for various types of vehicles have heretofore been proposed and used commercially with varying degrees of success, and in most cases these prior visors have been constructed for attachment as accessories to standard trucks and automobiles. Due to the varying contours of the windshields of such vehicles, and to the differences in width thereof, it is necessary in order to provide a universally applicable windshield visor accessory, to make provision for effecting adjustment of the visor panels both as to length and relative angularity; and it is also necessary to properly brace these visor structures in various angular positions relative to the windshield, so as to avoid disruption thereof when applied to vehicles travelling at high speed. While some prior attempts at universal adjustability and bracing have heretofore been proposed, these have become more and more inadequate due to excessive streamlining and other modifications of new car windshields and bodies.

It is therefore a more specific object of the present invention to provide an improved vehicle windshield visor unit which is readily adjustable and firmly attachable to windshields and vehicle bodies of various styles, shapes, and sizes, and which will present a highly finished and aesthetic appearance when properly assembled and applied.

Another important object of my invention is to provide an improved windshield visor accessory, which is adapted for convenient angular up and down adjustment relative to the windshield, and which may be firmly held in various positions of such angular adjustment at various points throughout its length without subjecting the windshield to undesirable stress.

A further important object of this invention is to provide an exceedingly rigid and durable windshield visor panel assembly, having a central section and a panel or wing section disposed on each of the opposite sides of the mid-section, each wing panel being both longitudinally adjustable and angularly adjustable relative to the central section.

Still another object of my present invention is to provide an improved visor for automobile windshields or the like, which may be readily constructed at moderate cost from durable metal for convenient application to various types of standard vehicles, and which may be quickly adjusted to most effectively perform its intended duty.

An additional object of the invention is to provide various improvements in windshield visors of the type forming the subject of copending application Serial No. 712,216, filed November 25, 1946, now Patent Number 2,506,108, issued May 2, 1950, whereby the utility of such devices is enhanced to a maximum while application thereof to various kinds of vehicles is facilitated.

These and other objects and advantages of the present invention will be apparent from the following detailed description, and some of the novel features of windshield visor construction shown but not specifically claimed herein, constitute the subject of the copending application above identified.

A clear conception of the features constituting my present improvements, and of the mode of constructing and utilizing typical automobile windshield visors embodying these features, may be had by referring to the drawings accompanying and forming a part of this specification wherein like reference characters designate the same or similar parts in the various views.

Fig. 1 is a part sectional plan view of one of my improved visor assemblages with parts broken away to reveal normally concealed structure, and showing various possible positions of adjustment of the wing panels in dot-and-dash lines;

Fig. 2 is a side view of the windshield visor assemblage of Fig. 1;

Fig. 3 is a greatly enlarged transverse section through a fragment of the visor assemblage of Figs. 1 and 2, taken along the line 3—3 of Fig. 1;

Fig. 4 is a moderately enlarged plan view of a fragment of the central portion of the panel assemblage, with portions broken away to reveal normally concealed structure;

Fig. 5 is a similarly enlarged section through the structure of Fig. 4, taken along the line 5—5;

Fig. 6 is a likewise enlarged section through the assembly of Fig. 4, taken along the line 6—6;

Fig. 7 is a part sectional side view of one type of improved center prop for holding the composite visor in various positions of angular adjustment relative to the windshield;

Fig. 8 is a bottom view of a casing for adjustably attaching the prop strut of Fig. 7 to the visor panel assemblage, looking in the direction of the arrow 8 in Fig. 7;

Fig. 9 is a rear end view of the attaching casing of Fig. 8;

Fig. 10 is a part sectional side view of another type of improved center prop for holding the visor in various angular positions relative to the windshield;

Fig. 11 is a front elevation of the adjustable prop strut of Fig. 10; and

Fig. 12 is an enlarged section through the modified prop assemblage of Fig. 10, taken along the line 12—12.

While the invention has been shown and described as being especially applicable to windshield visors for standard enclosed automobiles of various types, it is not my desire to unnecessarily restrict the scope or the utility of the improved features by virtue of this limited embodiment, since some of the improvements may obviously be advantageously applied to visors for other types of vehicles for land, air or water transportation; and it is also contemplated that specific descriptive terms used herein be given the broadest possible interpretation consistent with the disclosure.

Referring to Figs. 1 to 6 inclusive of the drawings, the typical automobile windshield visor unit shown therein, comprises in general a composite central panel assemblage consisting primarily of a sturdy lower mid-section 14 having an upper cover plate 15 secured thereto by means of screws 17 and nuts normally concealed by a decorative strip 16, the section 14 also being provided with front and rear radius bars 18, 19 respectively; a pair of oppositely directed wing panels each consisting of an inner section 20 swingably attached to a side portion of the mid-section 14 by a pivot 21 and being attachable to the adjacent curved bars 18, 19 by means of bolts 22 in various positions of relative angular adjustment, each wing panel also having an outer section 24 which is telescopically adjustable within and relative to the outer swinging end of its carrying section 20 so as to vary the overall length of the visor; a supporting bracket 25 at the outermost extremity of each wing panel section 24 and to which the said extremities are swingably attached by means of sturdy pivot pins 26, and relative to which the wing panels are adapted to be firmly held in various inclined positions with the aid of arcuate links or arms 27; and a center prop coacting with a medial portion of the wing panel assemblage for holding the same in any selected position of angular adjustment relative to the windshield 28.

The visor panel sections 14, 20, 24 and the cover plate 15, strip 16, bars 18, 19, brackets 25 and links 27 are all preferably formed of durable sheet metal with the aid of punches and dies, and the sections 14, 20, 24 are curved in the direction of travel of the vehicle so as to conform generally with the curvature of the front portion of the top enclosure or vehicle body. As shown in Figs. 4, 5 and 6, the lower mid-section 14 is provided with integral upright opposite side flanges 29 which bear against the lower faces of the adjacent panel sections 20 throughout their widths and remote from the connecting pivots 21, and the innermost edges of the panels 20 are provided with integral depending flanges 30 which likewise bear against the mid-section 14. The upper cover plate 15 snugly engages the upper faces of the panel sections 20 and is provided at its front and rear ends with integral flanges 31 which extend around the adjacent edges of the swingable panel sections 20, and the decorative strip 16 is secured within an upper elongated detent 32 formed in the plate 15 while this plate 15 and the flanges 30 are urged into snug clamping engagement with the intervening panel sections 20 when the screws 17 are applied to the mid-section 14 and to threaded locking plates 33 disposed within the decorative strip 16 as shown.

Each of the arcuate radius bars 18, 19 is firmly attached to the lower mid-section 14 by means of a rivet 34 or otherwise as illustrated in Fig. 6, and each of these bars is provided with a series of spaced holes 35 with which the bolts 22 are cooperable. The bolts 22 are adapted to coact with openings formed within sockets 36 in the ends of the panel sections 14, and the holes 35 of the bars 18, 19 are disposed on arcs generated about the pivots 21 as centers, and the spacing of the holes 35 is such that the bolts 22 may be utilized to lock the panel sections in various positions of relative angular adjustment as indicated by the dot-and-dash lines in Fig. 1. Such angular adjustment of the wing panels may be readily effected for application of the visor to a selected style or type of vehicle, before the cover plate 15 and decorative strip 16 have been finally applied; but after these elements have been applied to the assemblage, the wing panels will be firmly attached and locked to the mid-section 14 and all fastenings will be concealed from normal view. The flanges 29 of the mid-section 14 will then coact with the lower surfaces of the panel sections 20, and the flanges 30 of these panel sections 20 will likewise coact with the upper surface of the mid-section 14, on opposite sides of the attaching pivots 21 and bolts 22, thus insuring utmost rigidity and strength.

Each inner panel section 20 has rolled forward and rear integral edge beads 38, and each outer panel section 24 is likewise provided with forward and rear integral beads 39 of smaller diameter, adapted to telescope within the beads 38 of the adjacent section 20, as clearly shown in Figs. 1 and 3. The beads 38 of the medial panel sections 20 are each provided with a single hole 40, and a round metal rod 41 having a series of drilled holes therein adjacent to each hole 40, is snugly slidably confined within the adjoining portion of each inner bead 39. The panel sections 24 may then be telescoped within the outer ends of the sections 20, any desired distance in order to obtain a selected overall panel length, and when the holes 40 have been aligned with the proper holes of the adjacent series, self-tapping screws 42 may be inserted through the holes 40 and driven into the drilled holes of the rods 41 to thereby permanently and rigidly unite each set of panel sections 20, 24 in properly adjusted position. Since the transverse curvature of all of the panel sections 14, 20, 24 and of the cover plate 15 and strip 16 is the same, a neat and highly aesthetic final panel assemblage will result.

The outermost ends of the panel sections 24 are provided with integral downwardly extending flanges 43 which merge smoothly into the front beads 39 thereof, and these flanges 43 besides cooperating with the beads 39 to provide exceedingly stiff and durable panel sections 24, also serve as rigid mounting portions for the panel assemblage which are pivotally attached to the upper ends of the mounting brackets by the pivot pins 26. Each of the brackets 25 has a pair of integral inwardly and rearwardly projecting flanges 44 which are adapted to be firmly secured to the side posts of the windshield 28 within the front door openings by means of self-tapping screws or otherwise, and the arcuate adjusting links 27 are swingably secured at their upper ends to the adjacent panel flanges 43 while their lower ends are adjustably attachable to the corresponding brackets 25 by means of screws 45 coacting clamping plates having projections snugly cooperable with and extending into selected openings 46 of a series formed in each link 27. The links 27 are arcuately curved about the axes of the pivot pins 26 as generating centers, and the openings 46 and screws 45 provide effective means for varying the angularity of the visor panel assemblage relative to the windshield 28 and for holding the outer ends of the assemblage in properly adjusted position.

While the end brackets 25 and links 27 are usually sufficient to support the visor panel and to prevent undesirable distortion and displacement thereof, it is preferable to also brace the intermediate portion of the panel. When the windshield 28 is provided with a central division strip, one or more center props interposed between the midsection 14 and the windshield division strip, may be utilized as shown in the copending application hereinbefore referred to, but when no such division strip is present in the windshield 28 or in cases wherein it is desired to avoid excessive stress on the windshield structure, I prefer to employ an improved reinforcing prop connecting the mid-section 14 of the visor panel directly with the vehicle body forwardly of and beneath the windshield 28. Several types of this improved prop assembly are shown in the drawings, and both of these are adapted to provide sufficient support for the visor without interfering with the angular adjustability of the visor panel.

Referring to Figs. 7 to 9 inclusive, the reinforcing prop assembly shown therein, comprises in general a tubular strut 48 having its lower end swingably secured to a plane attaching bracket 49 by means of a pivot pin 50, while its upper end is firmly attached to a curved plate 51 and is slidably adjustable along an elongated slot 52 formed in a casing 53 secured to the bottom of the midsection 14 of the visor panel by screws 54. The lower bracket 49 is adapted to be firmly secured to the automobile body 55 beneath the engine hood 56 with the aid of screws 57; and the retainer plate 51 is formed to ride along the curved bottom of the casing 53 during up or down swinging adjustment of the visor panel, and may be clamped in any desired position of adjustment by means of an outer plate 58 and screws 59 coacting therewith and with locking clips 60 associated with the opposite ends of the upper plate 51. The two extreme positions of inclination adjustment made possible by this prop assemblage, are shown in solid and dot-and-dash lines in Fig. 7, and the visor panel may obviously be effectingly reinforced with this assemblage without interfering with the angular adjustment thereof and without stressing the windshield structure.

Referring more especially to Figs. 10 to 12 inclusive, the modified reinforcing strut assembly shown therein, comprises a telescopic strut 62 having a lower tubular section 63 the lower extremity of which is swingably secured to an angular bracket 64 by means of a pivot pin 65, and within the upper open end of which another tubular section 66 is slidably adjustable. The tubular section 66 is provided with a series of internally threaded holes 67 while the upper portion of the lower strut section 63 has several holes adapted to be alined with successive sets of the holes 67, and screws 68 may be driven into the holes 67 as shown in order to firmly hold the sections 63, 66 of the strut 62 in various positions of longitudinal adjustment. The tubular sections 63, 66 of the telescopic strut 62 have streamlined transverse cross-section as illustrated in Fig. 12, and the lower bracket 64 is adapted to be firmly secured to the vehicle body 55 beneath the engine hood 56 by means of screws 57 thus avoiding direct contact with the windshield. The upper extremity of the prop section 66 is rigidly attached to a sector plate 70 having several arcuate series of holes 71 therein, and which is hingedly connected to a bifurcated bracket 72 by means of a hinge pin 73, this bracket 72 being firmly attached to the lower front portion of the visor panel section 14 by screws 74 and having parallel flanges 75 between which the plate 70 is confined. The flanges 75 are provided with openings adapted to be alined with selected holes 71 of the two series, and may be locked to the plate 70 by means of bolts 76, thereby permitting angular adjustment of the visor panel relative to the windshield between the limiting positions defined by the solid and dot-and-dash illustrations of the visor while also providing means for locking the strut assemblage in various adjusted positions.

In order to apply one of the improved visor units to a vehicle windshield 28 after the parts have been properly constructed as described, it is only necessary to initially angularly adjust the panel sections 20 relative to the midsection 14 by swinging these sections 20 about the pivots 21 and by thereafter locking the same in adjusted position with the aid of the bolts 22, and to thereafter adjust the end panel sections 24 within the inner sections 20 in order to obtain the desired overall panel length. The cover plate 15 and elongated strip 16 may then be applied in order to complete the medial portion of the visor panel, and the screws 42 should also be applied to maintain the panel sections 20, 24 in proper position of longitudinal adjustment, whereupon the brackets 25 may be fastened to the side posts of the windshield within the adjacent door openings and the links 27 and screws 45 may be utilized to obtain the desired angular positioning of the completed panel relative to the windshield 28. Either type of center prop shown in the drawings may finally be utilized to firmly brace the medial portion of the visor panel directly from the vehicle body 55 forwardly of the windshield 28, thus providing a strong but neat appearing and most effective outside windshield visor assemblage.

From the foregoing detailed description of the construction and operation of my improved windshield visor, it will be apparent that the invention in fact provides a simple universally adjustable visor unit or accessory which is conveniently applicable to various types of standard automobiles in a manner whereby even the most extreme forces acting upon the visor panel are effectively resisted. Such attachment is also made possible without undesirably marring the vehicle body and without subjecting the windshield itself to direct stress; and since the improved visor panel is formed of durable metal, it may also be utilized as an efficient radio aerial or antenna by merely providing simple insulation between the panel assemblage and its supports. The formation of the improved visor panel of a sturdy midsection 14 swingably adjustably supporting opposite inner sections 20 which in turn telescopically coact with outer panel suspension sections 24, produces a very rigid panel unit, and the curvature of these panel sections 14, 20, 24 produces a highly finished and aesthetic appearance especially when applied to modern streamlined automobiles. The various parts of the improved visor may be manufactured at moderate cost with the aid of punches and dies, and may also be readily applied to diverse vehicles by a novice. The invention has proven highly successful in actual use, and far superior to prior visor panel assemblages wherein the adjustability of the panel sections was obtainable only through weak attachments located at the center of the panel.

It should be understood that it is not desired to limit this invention to the exact details of construction and operation of the visor assemblage, herein specifically shown and described, for various modifications within the scope of the appended claims may occur to persons skilled in the art.

I claim:

1. In a vehicle windshield visor, a rigid mid-section, an elongated rigid end panel section overlapping each of the opposite ends of said mid-section, a single fixed pivot swingably connecting the overlapped end of each panel section with the adjacent end of said mid-section midway between the front and rear edges of the sections, said pivots being formed to permit only relative angular displacement of the united sections and to prevent relative longitudinal displacement thereof, a holding bar secured to each of the front and rear portions of said mid-section and being attachable to the adjacent portions of said panel sections to retain the latter in various positions of angular adjustment relative to said fixed pivots, and brackets for mounting the ends of said panel sections remote from said mid-section upon a vehicle.

2. In a vehicle windshield visor, a rigid mid-section, a longitudinally elongatable rigid end panel section overlapping each of the opposite ends of said mid-section, a single central pivot swingably connecting the overlapped end of each panel section with the adjacent end of said mid-section midway between the front and rear edges of the sections, said central pivots being formed to permit only relative angular displacement of the united sections and to prevent relative longitudinal displacement thereof, a holding bar secured to each of the front and rear portions of said mid-section and being attachable to the adjacent portions of said panel sections to retain the latter in various positions of angular adjustment relative to said central pivots, and brackets for tiltably mounting the ends of said panel sections remote from said mid-section upon a vehicle.

3. In a vehicle windshield visor, a rigid mid-section, an elongated rigid end panel section overlapping each of the opposite ends of said mid-section, a single fixed pivot swingably connecting the overlapped end of each panel section with the adjacent end of said mid-section midway between the front and rear edges of the sections, said pivots being formed to permit only relative angular displacement of the united sections and the overlapped portions of said sections on opposite sides of each pivot having integral oppositely directed transverse end flanges, a clamping plate carried by said mid-section and coacting with the overlapped ends of said panel sections to clamp said flanges against the adjacent sections, and brackets for mounting the ends of said panel sections remote from said mid-section upon a vehicle.

4. In a vehicle windshield visor, a rigid mid-section, a longitudinally elongatable rigid end panel section overlapping each of the opposite ends of said mid-section, a single fixed pivot swingably connecting the overlapped end of each panel section with the adjacent end of said mid-section midway between the front and rear edges of the sections, said pivots being formed to permit only relative angular displacement of the united sections and the opposite ends of said mid-section having integral upstanding flanges while the overlapped ends of said panel sections have depending integral flanges disposed on opposite sides of the adjacent pivots, and a clamping plate secured to said mid-section between said panel flanges and coacting with the tops of said overlapping panel ends to clamp said flanges edgewise against the adjacent sections, and brackets for mounting the ends of said panel sections remote from said mid-section upon a vehicle.

HOWARD C. RIEMANN.

REFERENCES CITED

The following references are of record in the file of this patent:

UNITED STATES PATENTS

| Number | Name | Date |
|---|---|---|
| 827,483 | Voorhees | July 31, 1906 |
| 969,687 | Farlin | Sept. 6, 1910 |
| 1,152,486 | Cash | Sept. 7, 1915 |
| 1,482,078 | Hiatt | Jan. 29, 1924 |
| 2,207,227 | Scott | July 9, 1940 |
| 2,253,353 | Sharp | Aug. 19, 1941 |
| 2,296,905 | Brunhoff | Sept. 29, 1942 |
| 2,334,856 | Atkinson | Nov. 23, 1943 |